No. 870,033. PATENTED NOV. 5, 1907.
E. W. HILDRETH.
FISH HOOK GUARD.
APPLICATION FILED APR. 10, 1907.

Witnesses:

Inventor:
Eugene W. Hildreth,
By his Attorney

UNITED STATES PATENT OFFICE.

EUGENE W. HILDRETH, OF MELROSE, MASSACHUSETTS

FISH-HOOK GUARD.

No. 870,033.  Specification of Letters Patent.  Patented Nov. 5, 1907.

Application filed April 10, 1907. Serial No. 367,354.

*To all whom it may concern:*

Be it known that I, EUGENE W. HILDRETH, a citizen of the United States, residing at Melrose, in the county of Middlesex and State of Massachusetts, have invented certain new and useful Improvements in Fish-Hook Guards; and I do hereby declare the following to be a full, clear, and exact description of the invention, such as will enable others skilled in the art to which it appertains to make and use the same.

My invention relates to fish hook guards for fishing tackle, such as rods and hooked lines carried thereby and consists particularly in a socket adapted to cover the barbed point of a hook, the socket being attached to the rod in such a manner as to prevent the hook from being easily disengaged and to protect the hands and clothing of a fisherman from being caught and pierced by said hook.

The usual practice of anglers when out for a days' fishing is to carry the rod or reel with the fishing line attached thereto in the hand or in some exposed way. Frequently the hooked end of the line becomes disengaged from its usual attachment, flies around in the air and endangers the clothing and hands of those handling the rods; and renders the lines, hooks or flies liable to injury by being broken or caught upon branches or other surrounding objects.

It has been the custom to stick the hook into a cork handle or into a piece of cork or into a wooden part, or attach it to the windings of the reel, but all such methods of attachment are uncertain and easy to disengage.

The object of the present invention is to provide a safety guard for the use of anglers of such a character that the hooked end of the line may be securely held in place and the barbed point properly covered so that it cannot possibly come into contact with the hands or clothing when the rod is being carried.

A further object of the invention is to provide means for quickly attaching and detaching the guard from the rod.

My invention is illustrated in the accompanying drawings in which:—

Figure 4:
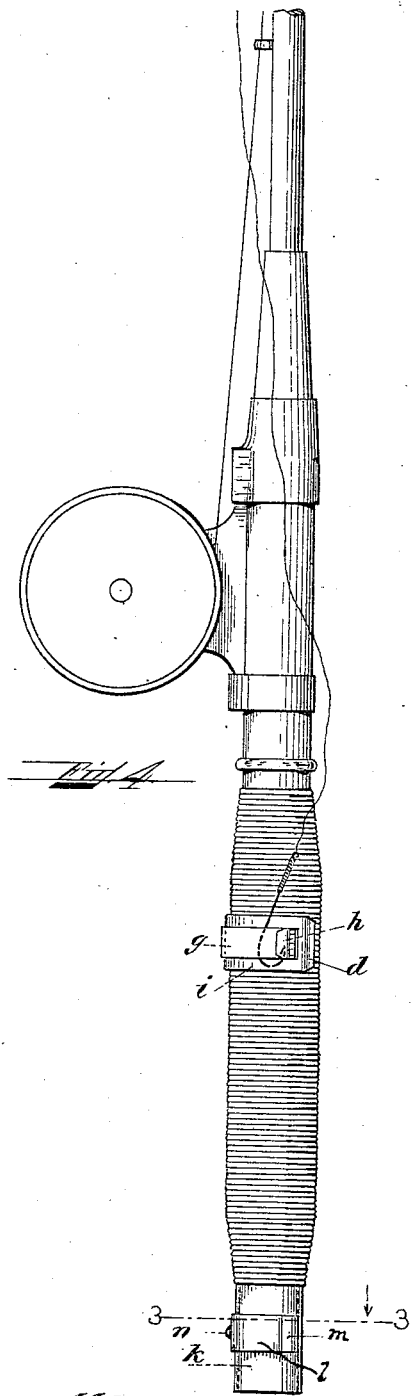
Figure 1:
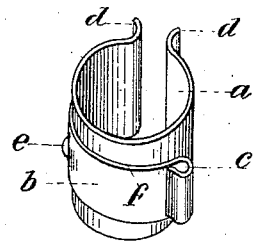
Figure 2:
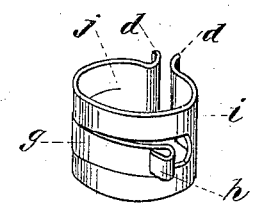
Figure 3:
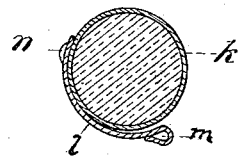

Figure 1 shows a form of my improved fish hook guard or receptacle removed from the rod. Fig. 2 shows a preferred form in which the receptacle, tongue and clip are one integral piece. Fig. 3 shows a cross section of Fig. 4 on line 3—3, wherein the tongue is fastened to the thimble which may be attached to the bottom of the rod shown in Fig. 4. Fig. 4 shows the handle of a fishing rod illustrating the use of my improved guard and showing the application to the rod of the forms of the device shown in Figs. 2 and 3.

Similar reference characters will be employed throughout the specification and drawings to designate corresponding parts.

As shown in Fig. 1, my improved safety guard consists of the clip $a$, the tongue $b$ and socket $c$, preferably made of spring sheet metal. The clip $a$ and tongue $b$ are curved as shown clearly in Fig. 1, and the clip $a$ will be bent outwardly at its free ends, preferably as shown at $d$, to facilitate its springing open, embracing and clinging to the handle of the rod, as shown in Fig. 4. The tongue $b$ may be secured to the clip $a$ by the rivet $e$ applied at one end of the tongue, and the free end of the tongue will be outwardly bent into the form of the socket as indicated at $c$. The parts may be stamped up from sheet metal and the tongue $b$ should lie close to and follow the contour of the clip $a$.

In Fig. 2 the tongue $g$ is formed substantially as the tongue $b$, with the socket $h$, except that it is integrally united to the clip $i$, as shown at $j$.

In Fig. 3 the clip $k$ and the tongue $l$ with the socket $m$ are united by the rivet $n$, this form differing from the others in that the clip $k$ is an endless ring or thimble, which may be driven over and secured to the butt of the fishing rod, as shown in Fig. 4.

In use the tongue shown in the different figures is bent outwardly sufficient to confine the shank of a hook beneath itself.

When the shank of the hook has been clasped under the outwardly bent portion of the tongue, the barbed end of the hook is placed in the socket on the tongue in such a way that the barb or point of the hook is unable to come into contact with surrounding objects or with the hand or clothing of the one carrying the tackle. The tongue also acts to flatten out a fly which has been wet by use and may hold it flat until it is dry.

Having described my invention I claim as new and desire to protect by Letters Patent of the United States:—

1. A fish hook guard for a fishing rod carrying a line with a hooked end, consisting in a socket secured to said rod to guard the barbed end of said hook.

2. A fish hook guard for a fishing rod carrying a line with a hooked end, consisting in a socket to cover the barbed end of said hook and a spring tongue carrying said socket secured to said rod adapted to confine said hook.

3. A fish hook guard for a fishing rod carrying a line with a hooked end, consisting in a socket on said rod to guard the barbed end of said hook and a tongue on said rod adapted to confine the said hook.

4. A fish hook guard for a fishing rod carrying a line with a hooked end, consisting in a socket to guard the barbed end of said hook, a spring tongue carrying said socket adapted to confine said hook and a spring clip adapted to secure said tongue to said rod.

5. A fish hook guard for a fishing rod carrying a line with a hooked end, consisting in a socket to guard the barbed end of said hook, a spring tongue carrying said socket adapted to confine said hook and a spring clip adapted to secure said tongue to said rod, said tongue and socket forming an integral part of said clip.

In testimony whereof I affix my signature, in presence of two witnesses.

EUGENE W. HILDRETH.

Witnesses:
T. HART ANDERSON,
MARY AVENIL KENNEY.